US007209897B2

(12) United States Patent  
Ghiloni et al.

(10) Patent No.: US 7,209,897 B2
(45) Date of Patent: Apr. 24, 2007

(54) SYSTEMS AND METHODS FOR CHARGE-BACK INVOICE GENERATION

(75) Inventors: Beth W. Ghiloni, Bridgeport, CT (US); Srinivas Jasthi, Madison, WI (US); Patrick M. Brand, Southport, CT (US); Judith M. Eckert, Stratford, CT (US)

(73) Assignee: Pitney Bowes Inc., Stamford, CT (US)

( * ) Notice: Subject to any disclaimer, the term of this patent is extended or adjusted under 35 U.S.C. 154(b) by 127 days.

(21) Appl. No.: 10/604,500

(22) Filed: Jul. 25, 2003

(65) Prior Publication Data

US 2004/0107164 A1 Jun. 3, 2004

Related U.S. Application Data (60) Provisional application No. 60/319,424, filed on Jul. 25, 2002.

(51) Int. Cl.
G06Q 40/00 (2006.01)

(52) U.S. Cl. .................... 705/40; 705/39; 705/35; 705/34

(58) Field of Classification Search ............ 705/40
See application file for complete search history.

(56) References Cited

U.S. PATENT DOCUMENTS 5,910,896 A * 6/1999 Hahn-Carlson ............ 700/231
5,978,780 A 11/1999 Watson ....................... 705/40
6,035,285 A 3/2000 Schlect et al. .............. 705/30
6,052,671 A * 4/2000 Crooks et al. .............. 705/34
6,128,602 A * 10/2000 Northington et al. ....... 705/35
2003/0004879 A1* 1/2003 Demoff et al. ............. 705/44
2003/0061358 A1* 3/2003 Piazza et al. ............... 709/227
2004/0039693 A1* 2/2004 Nauman et al. ............ 705/39
2006/0224507 A1* 10/2006 Torpin et al. ............... 705/40

OTHER PUBLICATIONS

Barron's Dictionary of Computer and Internet Terms, publisehd by Barron's Educational Series, Inc., Copyright 1998, ISBN 0764100947, p. 80 (check box) and p. 281 (macro).*

* cited by examiner

Primary Examiner—Jagdish N. Patel
Assistant Examiner—James M. Alpert
(74) Attorney, Agent, or Firm—George M. Macdonald; Angelo N. Chaclas (57) ABSTRACT

A method and system for collecting, translating, aggregating and presenting charges to a user is described. In a further configuration, a system and method for selecting charges and generating and managing invoices for charging back charges to either internal or external organizations is provided.

20 Claims, 7 Drawing Sheets

CONSOLIDATION OF CARRIERS AND PAYMENT

SHIPPING PAYMENTS SERVICE

HOME > SHIPMENTS

BACK | SAVE DATA TO EXCEL FILE | CHARGEBACKS

RUBIN & KRIS, ATTORNEY AT LAW
60 WALL STREET, FLOOR 99, NEW YORK, NY 10005-2301

SHIPMENTS FROM 01/01/01 TO 01/01/03
TOTAL NUMBER OF SHIPMENTS = 31

| SHIP DATE | DELIVERY DATE | CARRIER | TRADING # / REFERENCE # | ORIGIN ADDRESS | DESTINATION ADDRESS | TRANSACTION AMOUNT | WEIGHT | SERVICE TYPE |
|---|---|---|---|---|---|---|---|---|
| 12/18/01 | 1/1/02 | FEDEX | 832-343846220 | NORTH HAVEN, CT 06473-3254 | EDGEWATER, MD 21037-1208 SIGNED BY: PER FEDEX 207 | $10.11 | 8.34 LB | EXPRESS SAVER |
| 12/26/01 | 1/1/02 | FEDEX | 831-198268222 | NORTH HAVEN, CT 06473-3254 | BINGHAM, ME 04920 SIGNED BY: D. ELLEN REEL | $16.75 | 12.98 LB | EXPRESS SAVER |
| 12/26/01 | 1/1/02 | FEDEX | 831-198268255 | NORTH HAVEN, CT 06473-3254 | YARMOUTH, ME 04096 SIGNED BY: J. LOWELL | $7.25 | 0.77 LB | PRIORITY LETTER |
| 1/13/02 | 1/14/02 | UPS | 1Z9T2379029 | SHELTON, CT 06484 | ST. PETERSBURG, FL 33716 SIGNED BY: B. HUNTER | $29.13 | 3.50 LB | 2nd DAY AIR |
| | | | | SHELTON, CT | ST. PETERSBURG, | | | |

ABILITY TO DYNAMICALLY GENERATE CHARGEBACK BILL

RUBIN & KRIS, ATTORNEY AT LAW
60 WALL STREET, FLOOR 99, NEW YORK, NY 10005-2301

710

MAY 6, 2002

MR. ADRIAN CONNLEY
CABLE SERVICES
ONE PLAZA DR
WILMINGTON, DE 19890

DEAR MR. CONNLEY:

YOUR SHIPPING TRANSACTIONS FROM 12/10/01 TO 03/10/02.
TOTAL SHIPPING CHARGES FOR THIS BILLING CYCLE = $75.74

| SHIP DATE | DELIVERY DATE | ORIGIN ADDRESS | DESTINATION ADDRESS | CARRIER | TRADING # / REFERENCE # | SERVICE TYPE | WEIGHT | TRANSACTION AMOUNT |
|---|---|---|---|---|---|---|---|---|
| 1/20/02 | 1/21/02 | SHELTON CT 06484 | ST. PETERSBURG, FL 337 16 SIGNED B. HUNTER | UPS | S9959836966 | 2nd DAY AIR | 10.00 lb | $35.24 |
| 02/11/02 | 02/20/02 | NEY YORK, NY 10011-4357 | ST. PETERSBURG, FL 337 16 SIGNED B. HUNTER | FEDEX | 825-714018058 | PRIORITY OVERNIGHT | 3.50 lb | $28.26 |
| 02/19/02 | 02/27/02 | NEY YORK, NY 10011-4357 | ST. PETERSBURG, FL 337 16 60631 SIGNED B. HUNTER | FEDEX | 832-375521164 | PRIORITY LETTER | 3.50 lb | $12.24 |

TOTAL: $75.74

FIG. 7

SYSTEMS AND METHODS FOR CHARGE-BACK INVOICE GENERATION

CROSS REFERENCE TO RELATED APPLICATIONS

This application claims priority under 35 U.S.C. section 119(e) from Provisional Patent Application Ser. No. 60/319,424, filed Jul. 25, 2002, entitled Systems and methods for charge-back invoice generation which is incorporated herein by reference in its entirety.

BACKGROUND OF INVENTION

The illustrative embodiments disclosed in the present application are useful in systems including those for providing accounting functions and more particularly are useful in systems including those for providing charge-back invoice generation using aggregated bill data.

A system describing integrated bill consolidation, payment aggregation and settlement methods is described in U.S. Pat. No. 5,978,780, issued Nov. 2, 1999 to Watson and incorporated herein by reference.

In a typical office environment, such as a small law firm, charges are often incurred and they are often attributable to one or more clients. For example, a small law firm may have a mailroom staff that processes outgoing shipments. Additionally, the firm may use outside services and may procure goods. Shipping organizations such as FEDEX®, UNITED PARCEL SERVICE® (UPS®), AIRBORNE EXPRESS® and the UNITED STATES POSTAL SERVICE® (USPS) provide shipping services for shipping parcels. Furthermore, office service functions such as facsimile and copy processing are often provided by organizations such as Pitney Bowes Management Services, Inc. (PBMS). Office supplies and other goods are often obtained through vendors such as Staples.

In a small law firm, the firm may utilize only one shipper and have only one account number for the entire firm. In such case, the firm will typically receive one monthly bill itemizing charges over the last month. The shipments may include a reference code such as a client/matter identifier. The firm may then take a month or more to pay the shipping company. The firm will typically manually reconcile the charges listed on the bill from the shipper by having an employee identify the client/matter numbers where possible or investigating the source of the charges in order to enter the costs individually into an invoice for each client. Such reconciliation may occur on a monthly or quarterly basis. Similarly, services including copy and facsimile services may be utilized for various clients having more than one matter number.

Certain cost recovery systems such as those available from EQUITRAC® of Coral Gables, Fla. may allow the capture of internal point-of-service client/matter information for internally provided services. In such a situation the firm may connect a cost center terminal to each copy machine in order to facilitate the capture of usage information that then enables a periodic usage report generation for later cost allocation among clients. In such systems, certain usage data may be exported to an accounting system.

In another typical office environment such as a business office for a small manufacturing company, the shipping department may ship parcels using four different carriers for ten or more distinct departments inside the company. In such a situation, each department may have one or more distinct account numbers for each of the four carrier services. Accordingly, the accounts payable department may receive ten separate monthly bills from each of four carriers for a total of at least forty bills from shipping carriers each month. The carriers may wait a significant amount of time for payment and the employee may be confused by bills that may appear duplicative resulting in payment irregularities and errors that take significant resources to resolve. Additionally, service and goods vendors may provide numerous bills to the accounts payable department. The charges or some of the charges may then be charged back to internal cost centers or to clients by manually reconciling the received bills and entering the information into an accounting or billing system after the periodic bills are received.

SUMMARY OF INVENTION

The present application describes illustrative embodiments of systems and methods for collecting, translating, aggregating and presenting charge data to a user. In a further illustrative embodiment, a system and method for selecting charges and generating and managing invoices for charging back charges to either internal or external organizations is provided. In another further embodiment of the present application, a system for payment at the time of service is provided with the ability to provide charge information in real time allowing for timely charge back billing.

DETAILED DESCRIPTION

Systems and methods for charge-back invoice generation are described. Systems and methods for consolidating costs, paying for the costs and for aggregating cost information are also described. The embodiments described herein are representative systems used for illustrative purposes and other configurations may be used. Shipping service customers often provide shipping service providers with billing information and may receive bills on a monthly or other periodic basis. Similarly, other service and goods vendors may provide bills on a monthly basis or as services or goods are provided.

Methods for electronic bill presenting and bill consolidating are described in U.S. Pat. No. 6,035,285 issued Mar. 7, 2000 to Schlect, et al. and incorporated herein by reference. A system for computerized bill consolidation, billing payment authorization with remote access to the billing information is described in U.S. Pat. No. 6,052,671 issued Apr. 18, 2000 to Crooks, et al. and incorporated herein by reference.

In a first embodiment, a company provides a Charge-back Billing System service using a distributed data processing system such as an extranet. Alternatively, a locally hosted server may provide the functionality for a customer. The company providing the Charge-back Billing service maintains an account for each of a plurality of customers that may be utilized to bill the customer for a variety of services. In this illustrative example, the company provides charge cost consolidation using the account. At least one credit line and associated company sponsored credit card number are linked to the customer account.

The carrier and vendor billing information applicable to the service charges to be processed through the Charge-back Billing system is set-up or modified to correspond to the new company sponsored credit card. Accordingly, the customer is then ready to use the Charge-back Billing system to process service or other charges from the company or third-party vendors such as a shipping company.

For example, when a customer with a Charge-back Billing system account ships parcels (or purchases items including services), the shipments are charged to the company-sponsored credit card. The company sponsored credit card bank pays the vendor for the services. The customer receives a monthly invoice with shipping purchases and shipping detail and optionally other company provided services on the invoice. Several credit payment systems are known including sponsored credit cards from Visa and the Purchase Power (SM) service that is available from Pitney Bowes Inc. of Stamford Connecticut. In this example, the Purchase Power (SM) system is utilized as a customer account system. The customer continues to process outgoing shipments in the conventional manner using the company sponsored credit card for payment of the service charges such as the shipping charges incurred using an express parcel delivery carrier.

Additionally, other financial instruments may be utilized. For example, credit card used need not be company sponsored and the customer account need not be used. The customer credit card or other financial account may be the only financial account utilized. In another alternative embodiment, a customer may maintain more than one account with each carrier or vendor using different financial accounts.

In a further alternative embodiment, the customer may choose not to utilize the Charge-back Billing system extranet provided by the company. Instead, the customer may utilize the Charge-back Billing system locally in a system that is integrated with the customer's Information Technology (IT) systems. Additionally, E-Banking systems may be utilized for charge authorization and pass through services and may include services such as those services available from Certegy, Inc. of Alphareta, Ga.

Furthermore, in this illustrative embodiment, the customer receives only one bill per month rather than several or dozens of bills from the carriers. The customer may be able to take advantage of grace periods, credit lines or other financial instrument options. As described below, the system provides a customer with rich detail to enable value added services. The system retrieves shipping details and aggregates the information such that internal and external charge back cost centers are readily identified and the bill may be efficiently audited for discrepancies such as duplicate charges for a shipment.

Accordingly, in this illustrative embodiment, the carrier is directly paid by the company sponsored credit card bank and does not need to bill or collect payment from the customers. The payments may also be processed sooner than non-electronic payments directly from customers. Additionally, the carrier customers will benefit from the ease of the transactions in being billed only once per month.

In one illustrative embodiment, the system creates value added information. For example, a customer subscribes to the Charge-back Billing system service using the extranet. Whenever the customer ships packages (via any carrier including the USPS, FedEx, UPS or Airborne), the Charge-back Billing service system captures all the raw package details of the shipping transactions. The data may be pushed or pulled from the carriers and the payment system may provide notice that a relevant transaction has taken place. Similarly, whenever the customer requests a service job (such as a copy or supply order) from an out-source vendor such as Pitney Bowes® Management Services (PBMS), all of the raw details of the transaction are captured. Thus, raw customer transaction information is captured in a charge-back information database. The charge-back information database is used to store data in a common charge format. Accordingly, for each vendor, such as a carrier, a translator is provided to receive raw shipping or other transaction data and to convert the raw data into the standard format used with the charge-back information database. Of course, not all vendors will provide data for each available field.

The raw information is translated into value added information by augmenting each transaction with customer specific fields such as a cost center, and reference number (or client-matter number). These augmented fields are called the charge-back fields because they reference or tie together each customer transaction to an internal cost-center (within the customer company) or to an external customer client and/or client/matter identifier.

The customer may then access the Billing service charge-back extranet website via an Internet URL using a browser capable of running Java code. The Billing service system then utilizes Java to provide the customer with a thin client system used to access to the Charge-back Billing service including the charge-back database. The browser can also be used to launch other applications such as Abode Acrobat for PDF file utilization and Microsoft Word or other word processor for file manipulation.

In this illustrative embodiment, the customer generates charge-back bills in a three-step process. First, the customer selects the transactions that are to be charged to their clients or their internal business units. These transactions can be selected using one or more selection methods including a search by reference number (client-matter number) or by internal cost-center number, by customer city, or by customer zip code. Additionally, many known selection techniques can be utilized. A selection box can be selected for each entry or the MICROSOFT® Windows API can highlight selected transaction items. The website provides a robust search, sort and filter tool to select the transactions.

Secondly, the customer enters custom bill information (address, letter, and any miscellaneous surcharges). The customer may select a client record from a database of stored client records in order to populate static fields of the proposed invoice.

Finally, the customer generates a bill by clicking on the generate bill tab. Once the invoice is created, the customer can print the invoice or save the invoice as a word file. Additionally, the customer may save the invoice for future tracking purposes.

The customers may also track and archive the charge-back bills using the extranet. When a customer saves a charge-back bill, the Charge-back Billing service system tags all the transactions that are included in the particular client charge-back bill with a different background color in the display of the periodic bill from the vendor. The generated bill or invoice is saved as a PDF file and the customer is able to access the bill at any time using the extranet website. Customers do not need to wait until the end of the month to charge their customers or internal business units for the incurred shipping expenses. The customer can use the Charge-back Billing system to start creating charge-back bills as soon as the transactions are completed and the data is posted on the charge-back website. In such a system, the transaction data may be posted within two-to-three days.

The Charge-back Billing system aggregates information across these services in an automated fashion. From the customer perspective, the information aggregation aspects of this billing model are used to create operational efficiencies (either internal or external).

In this illustrative embodiment, value added aggregation of information is provided. Raw customer transaction information is captured across services and within services. The raw data is translated into a common format. Customer specific information (such as a charge-back letter template, charge-back address, customer client address data and logo) is maintained in the charge-back database and may be updated using the extranet website.

The customer optionally filters the transactions using a search/filter mechanism to slice-and-dice the information. The customer then selects the charge-back transactions for each bill. Alternatively, macros can be used to automatically select certain types of transactions for a particular charge-back bill. The customer then generates the bill and saves the bill for tracking purposes. The Charge-back Billing system uses a translator mechanism to allow input from vendors from all industries.

The specific logic and communications modules used to implement the present illustrative embodiment include combining available systems and customizations. The word processing module includes or calls the MICROSOFT® Word system available from Microsoft Corporation and may use templates and macros to generate form letters using known macro programming techniques. Similarly, available filter/search and database systems are utilized including the MICROSOFT® SQL product. ADOBE® Acrobat is used to archive files and the web server can be a MICROSOFT® web server. The Charge-back Billing system captures aggregated information by coupling a customer-subscribed service (such as shipping or copying service) to an information system of an intermediary.

Figure 1:
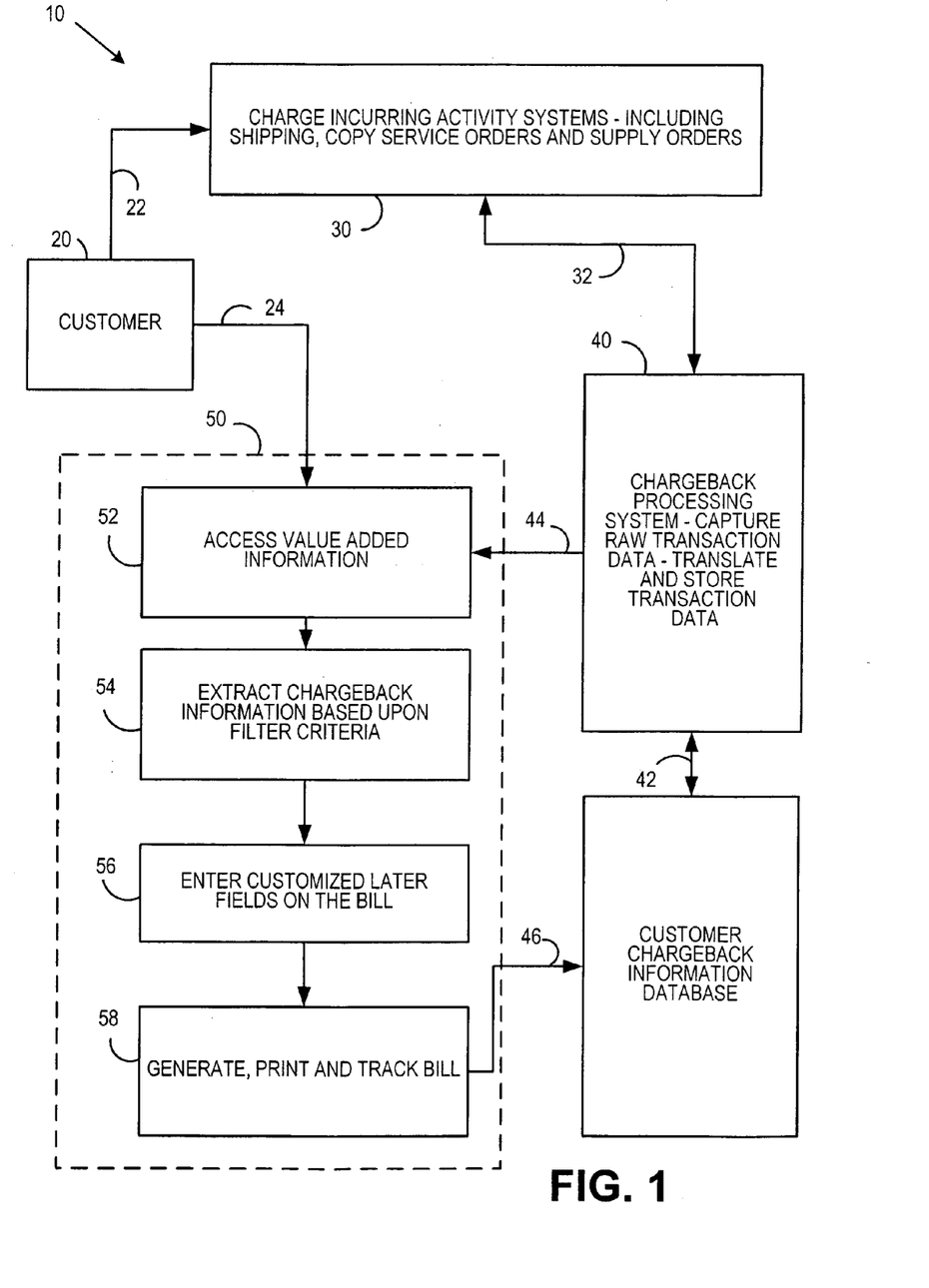
FIG. 1 is a schematic representation of a charge back bill generation system according to an illustrative embodiment of the present application.

Referring to FIG. 1, an illustrative embodiment describing a charge-back system 10 is shown. A customer 20 incurs charges 22 from vendors 30 that have information processing systems. The vendors 30 include service providers such as shipping companies including UPS, FEDEX, the USPS and AIRBORNE. Additionally, the possible vendors 30 include copy service vendors such as PBMS and may include supply vendors. The vendor systems 30 communicate with the charge-back processing system 40 using communications channel 32. The charge-back processing system 40 is connected to the customer charge-back information database 42. Alternatively, the customer charge-back information database 42 may be collocated with the charge-back processing system 40 and may be located locally with the customer 20.

The customer 20 has access to the interface process 50 using communications channel 24 in a thin client model wherein the customer 20 has access to value added information 52. The customer 20 may extract charge-back information based upon filter criteria 54. The interface 50 allows the customer to enter customized letter fields 56. In an alternative, a customer client database may be used to populate static client fields including address and contact data. The customer 20 then generates, prints and tracks bills using process 58.

Here, the charge-back processing system 40 may host ASP pages to provide the logic of the charge-back bill generation process 50 and to connect the charge-back information database 42 using the thin client browser 20.

In this illustrative embodiment, the data center is provided utilizing an extranet on a remote server using an Intel based system and Windows 2000 or other appropriate platform. The connections are Internet Web connections using typical wired LAN and WAN connections. Appropriate security including encryption and authentication such as VPN and password technology may be utilized. The servers may be redundant and may be load balanced including geographically load balanced. Additionally, other appropriate wireless and wired networks and connections may be utilized.

Figure 2:
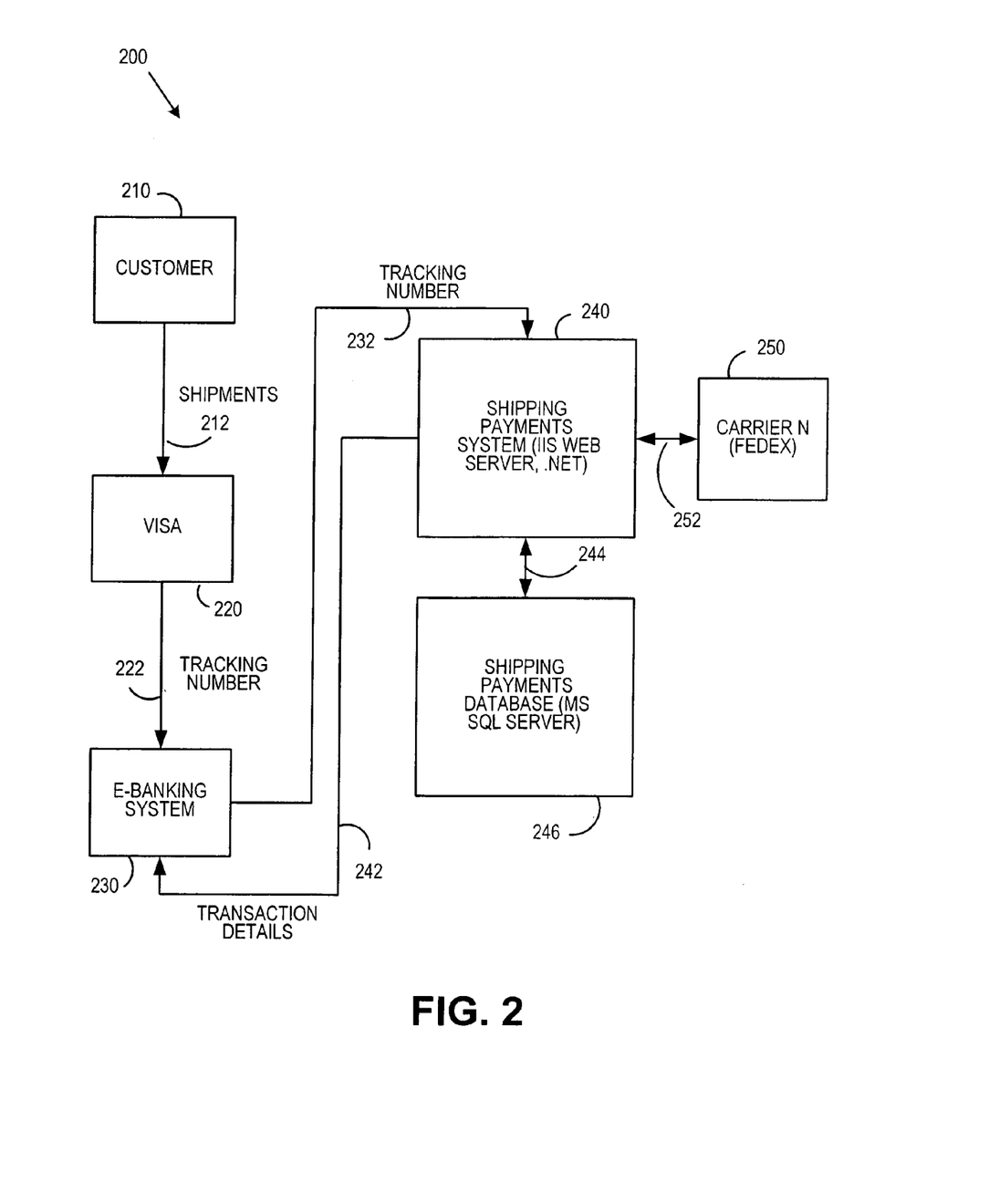
FIG. 2 is a schematic representation of a charge back bill generation system showing a data flow according to an illustrative embodiment of the present application.

Referring to FIG. 2, another illustrative embodiment describing a charge-back system 200 is shown. Customer 210 incurs charges for shipments 212 using a Visa card and the Visa billing system 220. A tracking number 222 is used to pass through the billing using an e-banking system 230. The tracking number 232 is provided to the shipping payments system 240 that provides transaction details 242. The shipping payments database 246 is connected to the shipping payments system, 240. The shipping payments system 240 communicates with the carrier 250 using communications channel 252. The shipping payments system 240 uses the tracking number 232 to request detailed shipping information from the carrier 250. The carrier then provides the requested shipping detail information. The shipping payments system 240 then uses a translator to reformat the data and places the reformatted data into a common format record in the shipping payments database 246.

The system 240 utilizes a standard charge format in an excel file having 10 columns of possible data including shipping data, cost, and charge-back data. Service and goods charges are also translated into the excel spreadsheet format.

Here, the Visa system 220 pushes information to billing system 240 when a charge has been made. The Visa system 220 pushes data including information about the charge such as the vendor, the customer and the tracking number. The billing system 240 then queries the vendor 250 for detailed shipping information and translates that response into a common charge format for presentment to the customer in an aggregated form. The shipping payments system 240 parses, obtains or determines client information such as a client/matter number to enable sorting of the data.

When a customer subscribes to the system, the customer provides customer data such as contact information and other data. The customer also provides data relating to the clients or internal cost centers of the particular customer. This client information is used in generating charge-back data and in generating bills. Several standard filters are provided and others may be created. For example, customers may sort or filter by client/matter numbers, date, charge amount or price, the name of client, origin address or destination address. The client/matter numbers may be used to fill in the billing information for a particular client charge-back bill. Additionally, a particular client may have different billing data according to the different matter numbers or internal cost center numbers.

Figure 3:
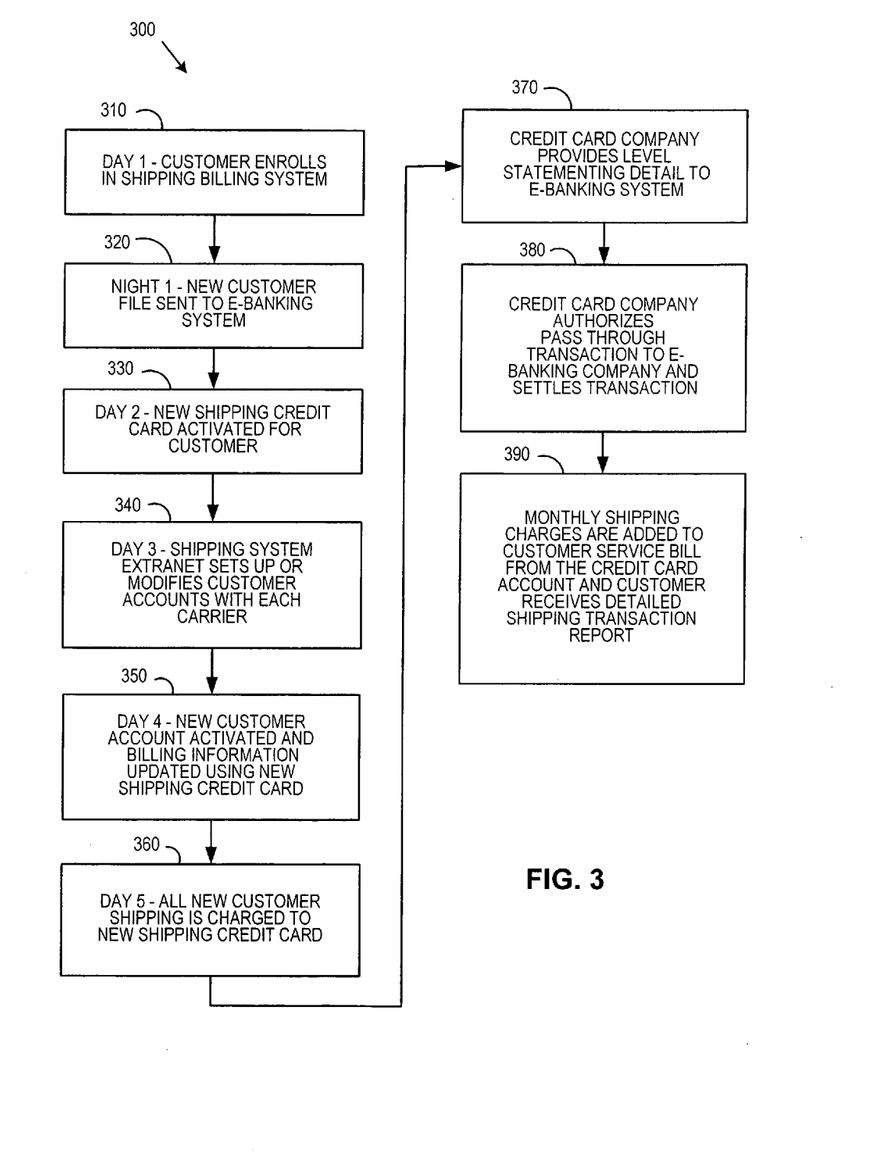
FIG. 3 is a block diagram illustrating the use of a charge back bill generation system according to an illustrative embodiment of the present application.

Referring to FIG. 3, a process 300 for utilizing an illustrative charge-back system is described. In step 310, a customer enrolls. In steps 320–350, the customer accounts are set up. In step 320, a new customer file is sent to an e-banking system. In step 330, a new shipping credit card account is activated for the customer. In step 340, the shipping billing system extranet system initiates a customer account with each carrier selected for participation. Alternatively, an existing customer account is modified. In step 350, the new customer account for the shipping system is activated and the billing information is updated using the new shipping credit card account information.

In step 360, the customer shipments are processed using the new system. The customer then uses the new credit card account to provide immediate billing information to the carrier rather than receiving a periodic bill that requests payment. As shown in block 370, the credit card company provides level statement detail to the e-banking system. As shown in block 380, the credit card company authorizes pass-through transactions to the e-banking company for transaction settlement and the transactions are processed. As shown in block 390, the system aggregates monthly shipping charges and detail that are added to the customer service bill from the credit card account. The customer receives one monthly shipping bill with detailed shipping transaction reports. The aggregated detailed shipping information is made available to the customer.

Figure 4:
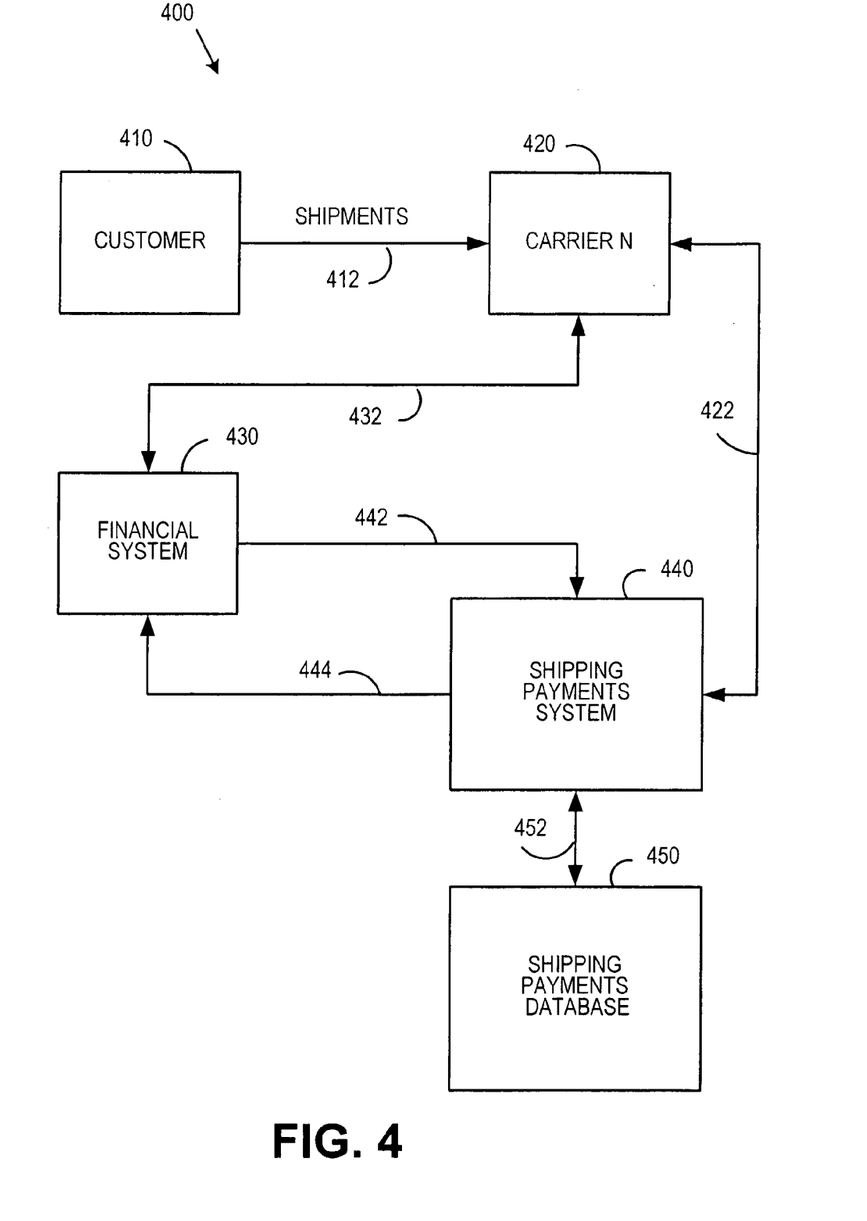
FIG. 4 is a schematic representation of a charge back bill generation system according to an illustrative embodiment of the present application.

Referring to FIG. 4, another illustrative embodiment describing a charge-back system 400 is shown. A customer 410 incurs charges for shipments 412 using carrier N 420. Carrier N 420 has billing data for the customer on file and charges the shipment using a financial account and the financial account billing system 430 using communications channel 432. Charge data is sent to the payments system 440 using communications channel 442. The payments system 440 may process charges other than shipping. Payments system 440 pulls data relating to the charge. The payments system 440 stores and processes the data as discussed above using the shipping payments database 450 and communications channel 452.

In an alternative, a dispute resolution process is implemented. The generated charge-back bill may also be submitted in electronic form with embedded intelligence to allow for a dispute process. For example, if a client disputes a charge, a return link is used to mark the charge in the billing system as disputed and to notify the customer.

In another embodiment, the billing system provides for authorization. The web interface validates the customer if he is subscribed for the service. If so he will be logged on to the site. If he is not a customer, a marketing page explaining the shipping payments service will appear and provide the potential customer with information relating to the subscription process.

In another embodiment, the billing charge data retrieval may be accomplished by default date ranges or by selecting a date range. Customers will be able to retrieve the output shipment transactions by a specific date range.

In at least one embodiment, the Charge-back Billing system includes a bill presentment module for presenting the shipments data for processing chargebacks. The module has additional input fields that allow a customer to enter data including a Chargeback List, Chargeback Address, Chargeback Letter and Surcharge field. When generating the Chargeback bill, the module parses the second part of the Tracking number/Reference number and populates it into a new column named Client Matter Number and also the Tracking number/Reference number column.

The customer may save the dynamic transaction data (that is created on the web pages) into an Excel file from the shipments screen. The customer may search and/or filter the output data by using any of the output shipment transaction fields from the Shipments or Generate Charge-backs screen. This system provides a one-field sort, but may also provide a multi-filed sort in a conventional manner.

In this billing service, the customer may select a set of shipping transactions and create a charge-back bill for the selection. This illustrative system allows the customer to enter data in rich text fields such as Chargeback Address Chargeback Letter and Surcharge field. The output charge-back bill can be saved into a word document or ADOBE® PDF format document.

When the customer selects the generate-charge-back bill function, the system processes all transactions that have checkboxes marked selected. The system presents a dynamic charge-back bill with summary totals and custom address, letter and logo fields. The surcharge field can be turned on and off based on the customer profile.

The system is used to manage the processed chargebacks. If a charge-back has been processed (for example, has been part of any of the charge-back bills) it will be presented with a different background color. However, a single charge-back can appear on multiple charge-back bills and this information will be tracked by the system as well. The charge-back service provides the ability for customers to track all the charge-back bills that are generated. A charge-back bill is defined as generated only when the customer prints or saves the bill as word file (or otherwise presents the bill and/or tracks the bill for payment). The customers then have the ability to create and/or delete these bills.

The customer may upload and/or update customer customizable fields such as the Charge-back Address, Charge-back Letter and Charge-back Logo fields by using the web interface. The customer will be provided the option to upload any of these fields in a CSV format and this data is maintained in the system database.

Figure 5:
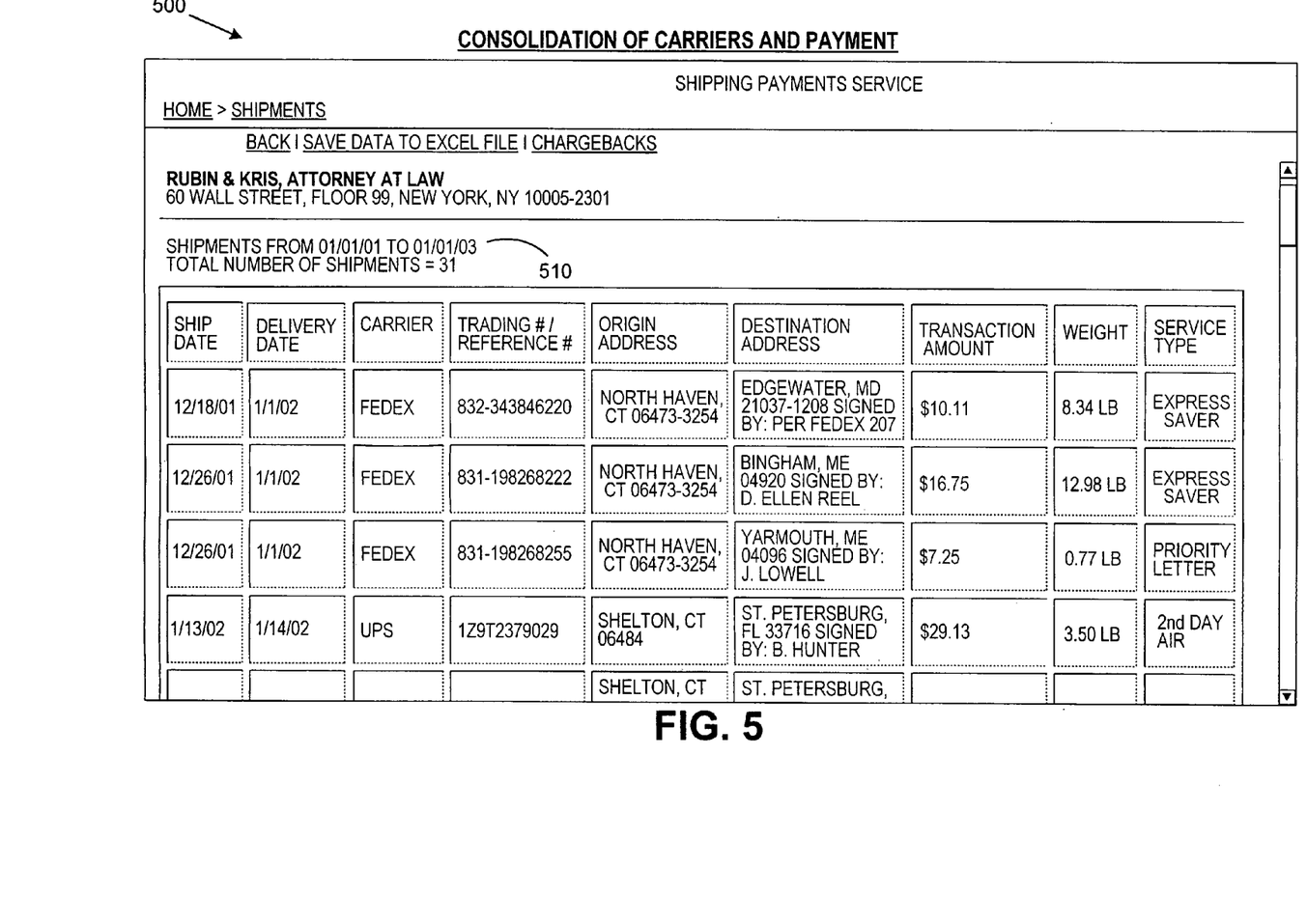
FIGS. 5–7 are screen displays of a charge back bill generation system according to an illustrative embodiment of the present application.
Figure 6:
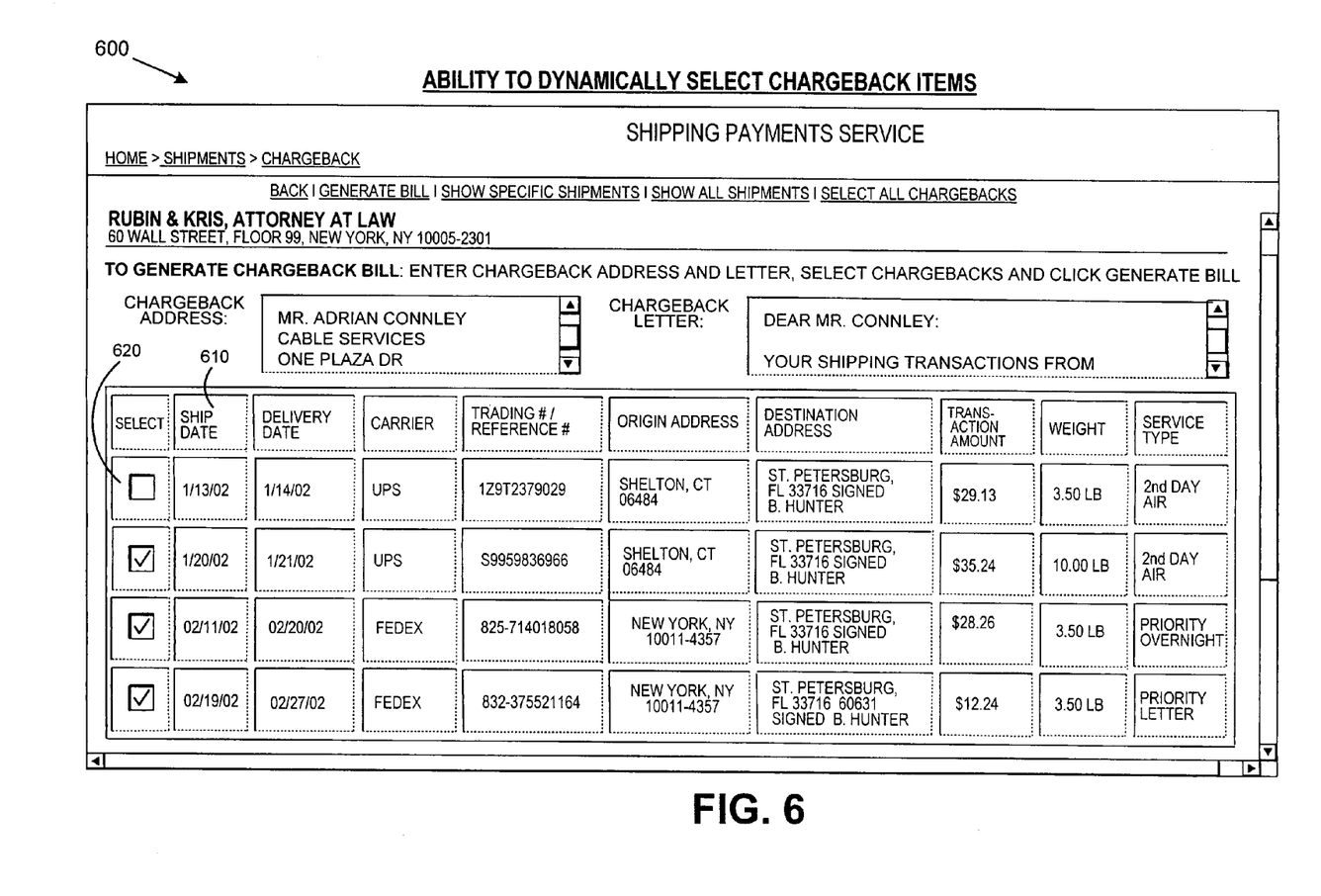
Figure 7:
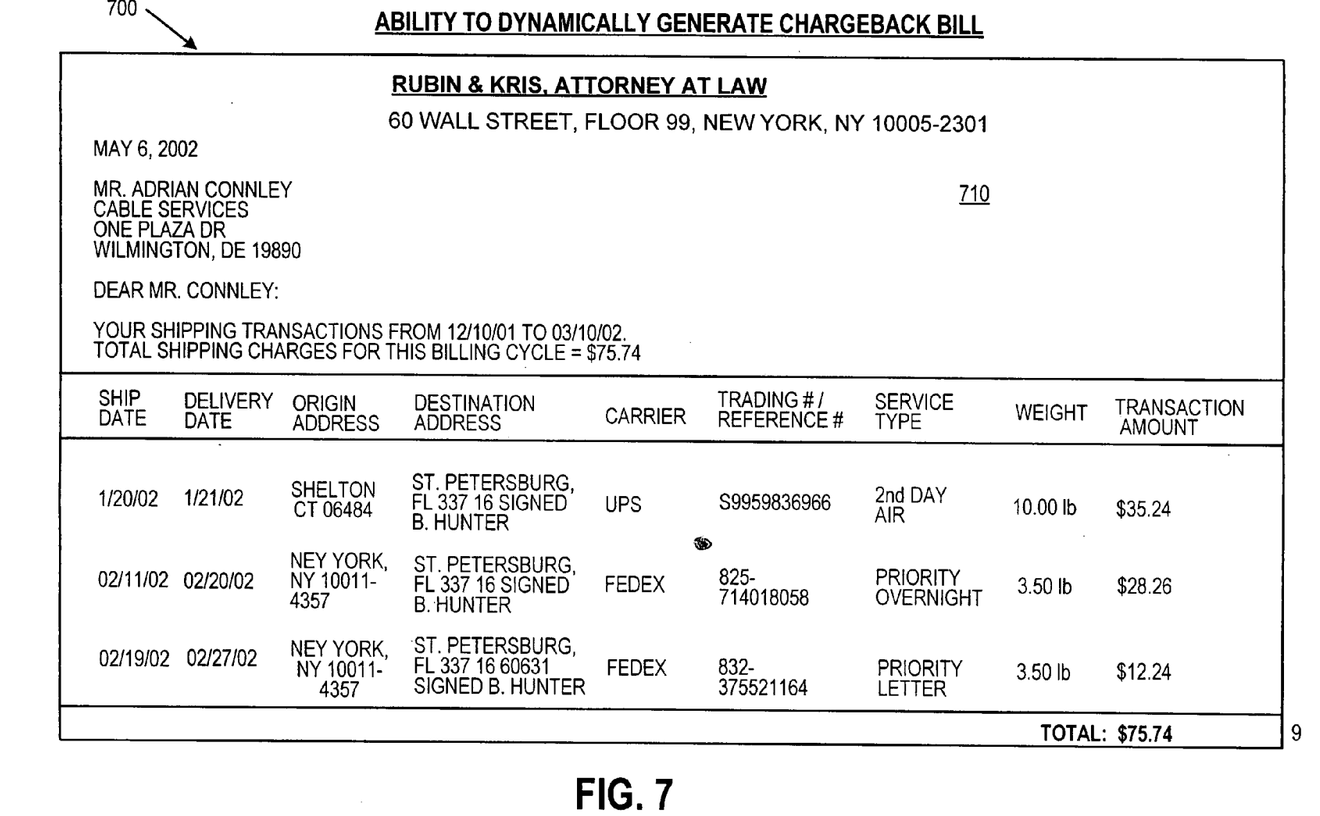

Referring to FIGS. 5–7, screen displays of a billing system according to one illustrative embodiment of the application is described.

In this illustrative embodiment, the billing system is implemented in an extranet system having a login screen for customers to sign in with a Customer Account Number (CAN) and a Personal Identification number (PIN). Alternatively, other authentication methods may be utilized.

A customer may be presented with a Shipments screen 500. A customer may enter a date range 510 to access all bill items. The customer may save the data to an excel file.

The customers may select Generate Chargebacks or Track Chargebacks from the Chargeback pull-down menu. The customer is presented with a charge-back selection screen 600. The customers may filter all bill items that are signed by a particular person and click on select all to select all bill items signed by that person for generating a charge-back bill. For example, table entry ship date 610 may be used as a sort key. Alternatively, other display table headings may be used as sort keys. Any of the data items may be used to filter charges and macros may be used to automate such selections. The customer may use the selection boxes 620 to select particular charges.

A customer may click on a Chargeback Letter tab to enter charge-back bill customer details, including any miscellaneous surcharges. The customer then generates the Charge-back bill for his customer and is presented a charge-back bill screen 700 having a charge-back bill 710 created using the selections and input from screen 600.

The customer may then save the Charge-back bill 710 for his customer or internal business unit for future reference. The customer may save the bill 710 for printing, viewing and tracking purposes. The customer can view the charge-back bill in a read-only PDF format and he can also print selecting File/Print from PDF menu. Additionally, the customer can edit the charge-back bill using MICROSOFT® Word. The bill items that were already included in a charge-back bill are now tracked in the system with an orange shade. The customers can access their previously generated charge-back bills by selecting Track Charge-backs from Charge-back pull-down menu. The customer can access the previously saved bill by clicking on a particular link such as client X's Bill for July.

The client/matter field may also be displayed. The client/matter information may be provided by the credit card company, the shipping company or derived from known information. For example, the destination address may be unique to a client or client/matter number. In such cases, the destination address may be used to determine the appropriate client/matter number based upon a database lookup operation.

The present application describes illustrative embodiments of a system and method for providing funds accounting and evidence of funds accounting using a wireless substrate-marking device. The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A method for aggregating shipping charges and generating charge-back invoices using a charge-back billing system comprising:
   receiving an indication of a plurality of shipping charges each from a respective financial institution from a plurality of financial institutions by a first user of at least one vendor, each indication including shipping charge data, a vendor identifier, and a shipping charge identifier;
   then requesting detail information regarding each of the plurality of charges from the at least one vendor using the vendor identifier and the shipping charge identifier received from the respective financial institution from a plurality of financial institutions;
   receiving detail information regarding each of the plurality of charges from the at least one vendor;
   storing and aggregating the shipping charge data received from the respective financial institution with the associated detail information regarding each of the plurality of charges received from the at least one vendor;
   augmenting the detail information for each of the plurality of charges by adding charge-back fields, creating aggregated augmented detail information wherein the charge-back fields are comprised of charge-back data received from the first user;
   providing access to the shipping charge data and associated aggregated augmented detail information for each of the plurality of charges to the first user;
   receiving selection data from the first user for at least one of the plurality of charges and associated augmented detail information; and
   then generating a charge-back bill based upon the selection data.

2. The method of claim 1 further comprising:
   tracking the inclusion of a particular charge on the particular bill, wherein a subset of charges are included on the particular bill and a remainder subset of the charges are included on at least one additional bill; and
   tracking the remainder subset on the at least one additional bill.

3. The method of claim 1 further comprising:
   receiving an indication of payment of the bill and tracking a charge-back payment status of each particular charge included on the bill.

4. The method of claim 1 further comprising:
   receiving a dispute indication from the first user regarding the charge from the first vendor.

5. The method of claim 1 wherein:
   the indication of a charge comprises a shipment tracking number, and wherein the at least one vendor is a shipping vendor and the charge-back fields include internal cost-center identifiers of the first user.

6. The method of claim 1 further comprising:
   translating the detail information regarding the charge into a common charge format.

7. The method of claim 1 further comprising:
   generating the charge-back bill based upon the selection data and parsed client information, and wherein the charge-back fields include external client-matter identifiers.

8. The method of claim 1 wherein:
   the indication of a charge is received from an E-banking intermediary.

9. The method of claim 1 wherein:
   the shipping charge identifier is a shipping tracking number.

10. The method of claim 1 wherein:
    the charge-back fields are associated with a plurality of customers of the first user.

11. The method of claim 10 wherein:
    the selection data is related to at least one of the plurality of customers.

12. The method of claim 1 wherein: the selection data is related to charge-back fields.

13. The method of claim 1 wherein:
    the charge-back bill includes the shipping charge data and associated aggregated augmented detail information for each of the selected charges.

14. The method of claim 1 wherein:
    the first user is providing access to the shipping charge data and associated aggregated augmented detail information before the associated billing cycle of the respective financial institution.

15. A method for aggregating business service charge for a user and generating charge-back invoices for the user's customers using a charge-back billing system comprising:
    receiving business service charge data including a vendor identifier and a charge identifier for a plurality of business service charges each from a respective financial institution by the user, wherein each of the business services charges are incurred using a particular vendor from a plurality of vendors;
    then requesting detail information regarding each of the plurality of business service charges from the particular vendor using the vendor identifier and the charge identifier received from the respective financial institution;

receiving detail information regarding each of the plurality of charges from the particular vendor;

storing and aggregating the business service charge data received from the respective financial institution with the associated detail information regarding each of the plurality of charges received from the particular vendor;

augmenting the detail information for each of the plurality of charges by adding charge-back fields comprised of charge-back data received from the user, creating aggregated augmented detail information;

providing access to the business service charge data and associated aggregated augmented detail information for each of the plurality of charges to the user before the associated billing cycle of the respective financial institution;

receiving selection data from the first user for at least one of the plurality of charges and associated augmented detail information; and then generating a charge-back bill based upon the selection data before the associated billing cycle of the respective financial institution.

16. A system for aggregating charges and generating invoices comprising:

a processor;

a storage device connected to the processor;

the storage device storing a logic program;

the processor operative with the logic program to perform:

receiving an indication of a charge from a respective financial institution by a first user of a first vendor;

requesting detail information regarding the charge from the first vendor referring to the indication;

receiving detail information regarding the charge from the first vendor;

storing and aggregating the detail information regarding the charge from the first vendor;

augmenting the detail information by adding charge-back fields related to a plurality of customers of the first user, creating aggregated augmented detail information, wherein the charge-back fields are comprised of charge-back data received from the first user;

providing access to the aggregated augmented detail information to the first user before the associated billing cycle of the respective financial institution;

receiving selection data from the first user for the aggregated detail information including charge-back fields related to the first user; and generating a bill based upon the selection data before the associated billing cycle of the respective financial institution.

17. The system of claim 16 further comprising:

the processor operative with the logic program to perform:

tracking the inclusion of the charge on a bill.

18. The system of claim 16 further comprising:

the processor operative with the logic program to perform:

receiving an indication of payment of the bill and tracking a charge-back payment status of the charge.

19. The system of claim 16 wherein:

selection data is received from an automated filter macro.

20. The system of claim 16 wherein:

selection data is received from a user indication including a checkbox selection.

* * * * *